(12) United States Patent
Hsieh et al.

(10) Patent No.: US 11,569,850 B2
(45) Date of Patent: Jan. 31, 2023

(54) RADIO FREQUENCY FRONT-END CIRCUIT AND CONTROLLER

(71) Applicant: VIVO MOBILE COMMUNICATION CO., LTD., Guangdong (CN)

(72) Inventors: Cheng-Nan Hsieh, Chang'an Dongguan (CN); Xuefeng Sheng, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/481,879

(22) Filed: Sep. 22, 2021

(65) Prior Publication Data
US 2022/0014219 A1 Jan. 13, 2022

Related U.S. Application Data

(63) Continuation of application No. PCT/CN2020/078865, filed on Mar. 11, 2020.

(30) Foreign Application Priority Data

Mar. 22, 2019 (CN) .......................... 201910222451.2

(51) Int. Cl.
*H04B 1/04* (2006.01)
*H04B 1/00* (2006.01)
*H04B 1/16* (2006.01)

(52) U.S. Cl.
CPC ......... *H04B 1/0483* (2013.01); *H04B 1/0078* (2013.01); *H04B 1/1615* (2013.01)

(58) Field of Classification Search
CPC ........ H04B 1/0057; H04B 1/006; H04B 1/44; H04B 1/0458; H04B 1/40; H04B 1/48;
(Continued)

(56) References Cited

U.S. PATENT DOCUMENTS 5,280,637 A 1/1994 Larosa
5,926,751 A 7/1999 Vlahos
(Continued)

FOREIGN PATENT DOCUMENTS

CN 104779437 A 7/2015
CN 104980960 A 10/2015
(Continued)

OTHER PUBLICATIONS

European Search Report dated Apr. 8, 2022 as received in application No. 20777810.1.
(Continued)

*Primary Examiner* — Golam Sorowar
(74) *Attorney, Agent, or Firm* — Maschoff Brennan

(57) ABSTRACT

A radio frequency front-end circuit and a mobile terminal are provided. The circuit includes: a first signal transmitting circuit and a second signal transmitting circuit; a first changeover switch and a second changeover switch; and a first double-pole double-throw switch. The first signal transmitting circuit is closed through the first double-pole double-throw switch and the first changeover switch and transmits a signal through a first antenna or second antenna, or is closed through the first double-pole double-throw switch and the second changeover switch and transmits a signal through a third antenna or fourth antenna. The second signal transmitting circuit is closed through the first double-pole double-throw switch and the first changeover switch and transmits a signal through the first antenna or the second antenna, or is closed through the first double-pole double-throw switch and the second changeover switch and transmits a signal through the third antenna or the fourth antenna.

17 Claims, 2 Drawing Sheets

(58) Field of Classification Search
CPC ........ H04B 1/0064; H04B 1/18; H04B 1/401; H04B 2001/0408; H04B 1/00; H04B 1/525; H04B 7/0404; H04B 1/50; H04B 1/0475; H04B 1/005; H04B 7/0602; H04B 1/52; H04B 7/04; H04B 1/04; H04B 7/0413; H04B 7/0686; H04B 1/406; H04B 1/0483; H04B 1/16; H04B 1/0078; H04B 15/02; H04B 7/0805; H04B 7/2621; H03F 2200/451; H03F 2200/294; H03F 3/72; H03F 2200/111; H03F 3/245; H03F 3/19; H03F 3/195; H03F 1/565; H03F 2200/222; H03F 2203/7209; H03F 1/56; H03F 2200/387; H03F 3/24; H03F 3/68; H03F 3/189; H03F 1/0277; H03F 3/191; H03F 3/211; H03F 2200/165; H03F 2200/192; H03F 2200/204; H03F 2203/7233; H03F 2203/7236; H03F 2203/7239; H03F 1/3211; H03F 2200/06; H03F 2200/09; H03H 7/38; H03H 7/46; H03H 9/725; H03H 9/6483; H03H 9/72; H03H 7/0115; H03H 9/6403; H03H 7/465; H03H 7/463; H03H 9/605; H03H 7/1758; H03H 9/542

See application file for complete search history.

(56) References Cited

U.S. PATENT DOCUMENTS

| | | | |
|---|---|---|---|
| 2004/0038660 A1 | 2/2004 | He et al. | |
| 2005/0064897 A1* | 3/2005 | Nohara | H04B 1/48 455/552.1 |
| 2006/0025171 A1* | 2/2006 | Ly | H04B 1/006 455/552.1 |
| 2010/0321130 A1 | 12/2010 | Kim | |
| 2012/0306716 A1 | 12/2012 | Satake | |
| 2014/0105079 A1* | 4/2014 | Bengtsson | H04B 1/005 370/297 |
| 2015/0229463 A1 | 8/2015 | Oh et al. | |
| 2019/0181550 A1* | 6/2019 | Chen | H01Q 21/28 |
| 2020/0313714 A1* | 10/2020 | Ono | H04B 1/006 |
| 2020/0373947 A1* | 11/2020 | Beppu | H03F 3/19 |

FOREIGN PATENT DOCUMENTS

| | | |
|---|---|---|
| CN | 106656248 A | 5/2017 |
| CN | 206211999 U | 5/2017 |
| CN | 107733450 A | 2/2018 |
| CN | 207266019 U | 4/2018 |
| CN | 108337013 A | 7/2018 |
| CN | 108808265 A | 11/2018 |
| CN | 109951192 A | 6/2019 |
| DE | 102017002799 A1 | 9/2017 |
| JP | 2002335197 A | 11/2002 |
| JP | 2006304081 A | 11/2006 |
| RU | 2107395 C1 | 3/1998 |
| RU | 2214050 C2 | 10/2003 |
| RU | 65319 U1 | 7/2007 |
| RU | 2479919 C1 | 4/2013 |
| WO | 2011061946 A1 | 5/2011 |

OTHER PUBLICATIONS

Chinese Search Report dated Jan. 6, 2020 as received in application No. 201910222451.2.

International Search Report and Written Opinion dated Oct. 7, 2021 as received in application No. PCT/CN2020/078865.

Japanese Office Action dated Sep. 13, 2022 as received in application No. 2021-556393.

Russian Office Action dated Aug. 19, 2022 as received in application No. 2021130764/07.

* cited by examiner

RADIO FREQUENCY FRONT-END CIRCUIT AND CONTROLLER

CROSS-REFERENCE TO RELATED APPLICATIONS

This application is a continuation application of a PCT Application No. PCT/CN2020/078865 filed on Mar. 11, 2020, which claims priority to Chinese Patent Application No. 201910222451.2, filed in China on Mar. 22, 2019, the disclosures of which is incorporated herein by reference in their entireties.

TECHNICAL FIELD

Embodiments of this disclosure relate to the field of terminal application technologies, and in particular, to a radio frequency front-end circuit and a mobile terminal.

BACKGROUND

With the rapid development of Internet communication technology and the increasing popularization of smart mobile terminals, users are having growing demands for data traffic. From a transmission rate of 100 Mbit/s to 1 Gbit/s in 4G to a peak transmission rate of up to 20 Gbit/s in 5G new radio (NR), the increase in rates requires 5G to support the key technology of 4×4 multiple input multiple output (MIMO).

FIG. 1 is a schematic structural diagram of a radio frequency front-end circuit of a 5G mobile terminal device. This circuit structure is used to realize one-transmit four-receive 1T4R and two-transmit four-receive 2T4R schemes. The layout wiring of the 5G mobile terminal device directly affects path loss. As shown in FIG. 1, in the radio frequency front-end circuit structure of the 5G mobile terminal device in the related art, the long wiring leads to a high path loss. In addition, in the radio frequency front-end circuit structure of the 5G mobile terminal device in the related art, a three-pole three-throw switch is typically used. A higher signal transmission frequency leads to a higher bandwidth and a greater component loss, making output power hard to meet requirements. Therefore, how to reduce the path loss, component loss, and circuit design complexity requires an urgent solution.

SUMMARY

Embodiments of this disclosure provide a radio frequency front-end circuit and a mobile terminal.

To resolve the foregoing technical problem, this disclosure is implemented as follows.

According to a first aspect, an embodiment of this disclosure provides a radio frequency front-end circuit, including:
  a first signal receiving circuit that receives a signal through one of a first antenna and a second antenna that are interconnected;
  a second signal receiving circuit that receives a signal through one of a third antenna and a fourth antenna that are interconnected;
  a first signal transmitting circuit and a second signal transmitting circuit;
  a first changeover switch and the second changeover switch; and
  a first double-pole double-throw switch, including: a first fixed terminal connected to the first changeover switch, a second fixed terminal connected to the second changeover switch, a first movable terminal, and a second movable terminal, where the first double-pole double-throw switch is configured to connect the first fixed terminal to the first movable terminal or the second movable terminal, and further configured to connect the second fixed terminal to the first movable terminal or the second movable terminal, where
  the first signal transmitting circuit is closed through the first double-pole double-throw switch and the first changeover switch, and transmits a signal through the first antenna or the second antenna; or the first signal transmitting circuit is closed through the first double-pole double-throw switch and the second changeover switch, and transmits a signal through the third antenna or the fourth antenna; and
  the second signal transmitting circuit is closed through the first double-pole double-throw switch and the first changeover switch, and transmits a signal through the first antenna or the second antenna; or the second signal transmitting circuit is closed through the first double-pole double-throw switch and the second changeover switch, and transmits a signal through the third antenna or the fourth antenna.

According to a second aspect, an embodiment of this disclosure further provides a mobile terminal, including:
  a controller; and
  the radio frequency front-end circuit in the foregoing embodiment, where
  the controller is configured to control opening and closing of a first double-pole double-throw switch, opening and closing of a first changeover switch, and/or opening and closing of a second changeover switch.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments obtained by persons of ordinary skill in the art based on the embodiments of this disclosure shall fall within the protection scope of this disclosure.

Figure 1:
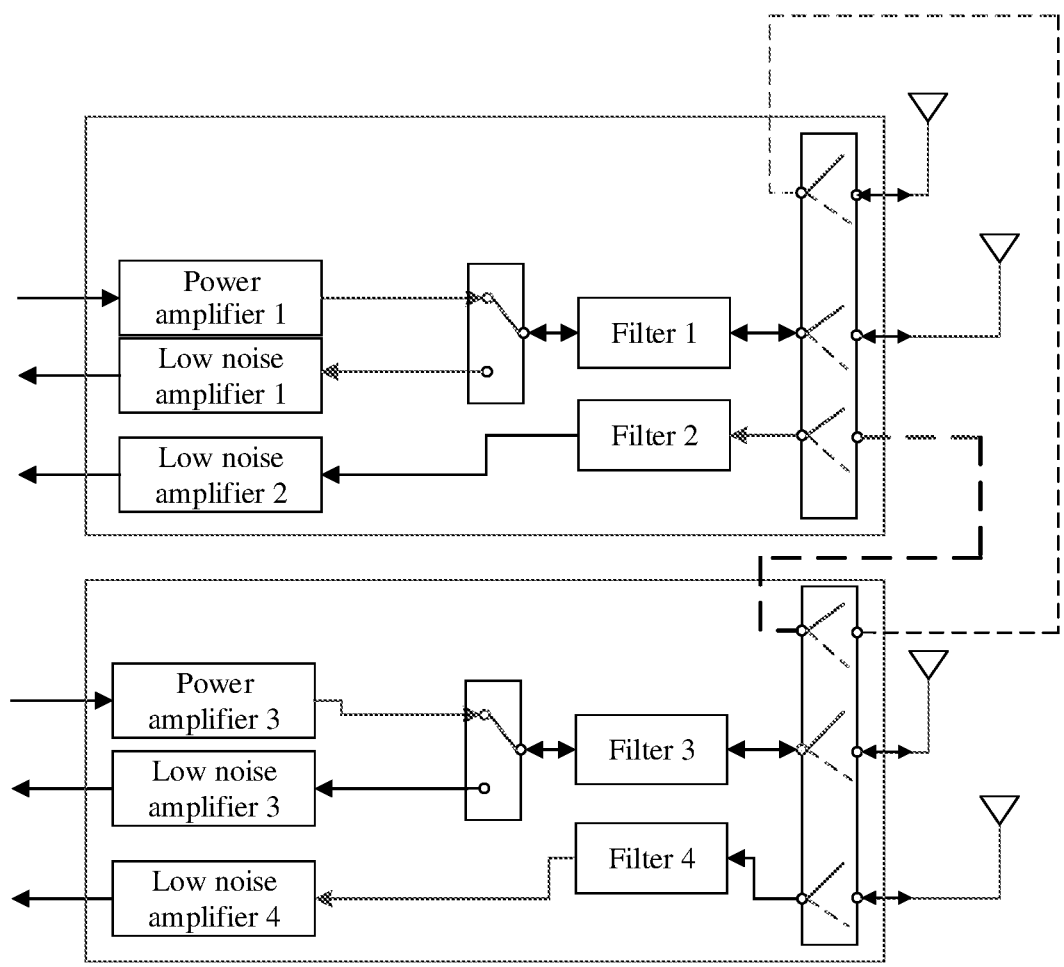
FIG. 1 is a schematic structural diagram of a radio frequency front-end circuit in the related art.
Figure 2:
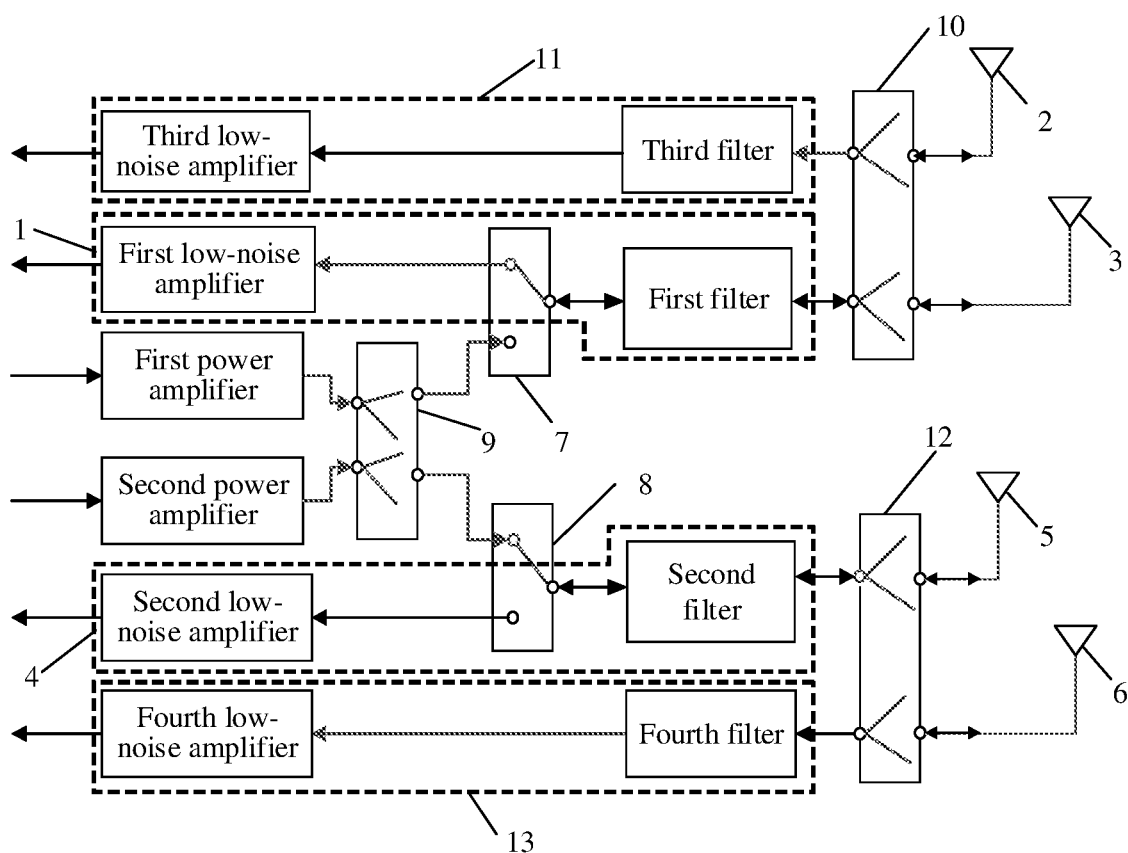
FIG. 2 is a schematic structural diagram of a radio frequency front-end circuit according to some embodiments of this disclosure.

FIG. 2 is a schematic structural diagram of a radio frequency front-end circuit according to some embodiments of this disclosure. The radio frequency front-end circuit includes: a first signal receiving circuit 1 that receives a signal through one of a first antenna 2 and a second antenna 3 that are interconnected; a second signal receiving circuit 4 that receives a signal through one of a third antenna 5 and a fourth antenna 6 that are interconnected; a first signal transmitting circuit and a second signal transmitting circuit; a first changeover switch 7 and the second changeover switch 8; and a first double-pole double-throw switch 9, which includes a first fixed terminal connected to the first changeover switch 7, a second fixed terminal connected to the second changeover switch 8, a first movable terminal, and a second movable terminal, where the first double-pole double-throw switch 9 is configured to connect the first fixed terminal to the first movable terminal or the second movable terminal, and further configured to connect the second fixed terminal to the first movable terminal or the second movable terminal.

The first signal transmitting circuit is closed through the first double-pole double-throw switch 9 and the first changeover switch 7, and transmits a signal through the first antenna 2 or second antenna 3; or the first signal transmitting circuit is closed through the first double-pole double-throw switch 9 and the second changeover switch 8, and transmits a signal through the third antenna 5 or fourth antenna 6.

The second signal transmitting circuit is closed through the first double-pole double-throw switch 9 and the first changeover switch 7, and transmits a signal through the first antenna 2 or second antenna 3; or the second signal transmitting circuit is closed through the first double-pole double-throw switch 9 and the second changeover switch 8, and transmits a signal through the third antenna 5 or fourth antenna 6.

Herein, both the first signal transmitting circuit and the second signal transmitting circuit can be flexibly closed through the first double-pole double-throw switch 9 and the first changeover switch 7 or through the first double-pole double-throw switch 9 and the second changeover switch 8, and can transmit a signal through any antenna of the radio frequency front-end circuit. The circuit design is simple, and provision of the first double-pole double-throw switch shortens a routing length between the circuit and the antennas, thereby reducing path loss.

Optionally, as shown in FIG. 2, the radio frequency front-end circuit according to some embodiments of this disclosure further includes a second double-pole double-throw switch 10 connected to the first signal receiving circuit 1 or the first signal transmitting circuit or the second signal transmitting circuit, including: a third movable terminal, a third fixed terminal connected to the first antenna 2, and a fourth fixed terminal connected to the second antenna 3, where the second double-pole double-throw switch is configured to connect the first movable terminal to the third fixed terminal or the fourth fixed terminal.

Herein, the second double-pole double-throw switch 10 can implement a connection between the following radio frequency circuit and the first antenna 2 or second antenna 3: the first signal receiving circuit 1 or the first signal transmitting circuit or the second signal transmitting circuit. Because the second double-pole double-throw switch 10 has low component loss and good isolation, not only transmission performance of the radio frequency front-end circuit can be improved, but also reception performance of the radio frequency front-end circuit can be improved.

Further, the radio frequency front-end circuit according to some embodiments of this disclosure further includes: a third signal receiving circuit 11, which is connected to a fourth movable terminal of the second double-pole double-throw switch 10 and receives a signal through one of the first antenna 2 and the second antenna 3, where the second double-pole double-throw switch 10 is further configured to connect the fourth movable terminal to the third fixed terminal or the fourth fixed terminal.

Herein, the second double-pole double-throw switch 10 can further implement a connection between the third signal receiving circuit 11 and the first antenna 2 or second antenna 3. Because the second double-pole double-throw switch 10 has low component loss and good isolation, transmission performance of the third signal receiving circuit 11 can be improved.

It should be noted that the second double-pole double-throw switch 10 includes two movable terminals (namely, the third movable terminal and the fourth movable terminal) and two fixed terminals (namely, the third fixed terminal and the fourth fixed terminal). Each of the movable terminals can be connected to one of the two fixed terminals.

Herein, the third signal receiving circuit 11 includes a third low-noise amplifier and a third filter, where the third filter is connected to both an input terminal of the third low-noise amplifier and the fourth movable terminal of the second double-pole double-throw switch 10.

Specifically, when a fifth movable terminal of the first changeover switch 7 is connected to a fifth fixed terminal of the first changeover switch 7, the first signal receiving circuit 1 is closed.

When the fifth movable terminal is connected to a sixth fixed terminal of the first changeover switch 7, and the first movable terminal of the first double-pole double-throw switch 9 is connected to the first fixed terminal of the first double-pole double-throw switch 9, the first signal transmitting circuit is closed, and the first fixed terminal is connected to the sixth fixed terminal.

When the fifth movable terminal is connected to a sixth fixed terminal of the first changeover switch 7, and the second movable terminal of the first double-pole double-throw switch 9 is connected to the first fixed terminal of the first double-pole double-throw switch 9, the second signal transmitting circuit is closed.

Herein, optionally, the first changeover switch 7 is a single-pole double-throw switch, including a movable terminal (namely, the fifth movable terminal) and two fixed terminals (namely, the fifth fixed terminal and the sixth fixed terminal). The first changeover switch 7 implements switching between a receiving circuit and a transmitting circuit.

Based on this, in an optional embodiment, the first signal receiving circuit 1 includes a first low-noise amplifier and a first filter.

Specifically, an input terminal of the first low-noise amplifier is connected to the fifth fixed terminal of the first changeover switch 7; and the first filter is connected to both the fifth movable terminal of the first changeover switch 7 and the third movable terminal of the second double-pole double-throw switch 10.

Optionally, as shown in FIG. 2, the radio frequency front-end circuit according to some embodiments of this disclosure further includes a third double-pole double-throw switch 12 connected to the second signal receiving circuit 4 or the first signal transmitting circuit or the second signal transmitting circuit, where the third double-pole double-throw switch 12 includes a sixth movable terminal, a seventh fixed terminal connected to the third antenna 5, and an eighth fixed terminal connected to the fourth antenna 6, where the third double-pole double-throw switch 12 is configured to connect the sixth movable terminal to the seventh fixed terminal or the eighth fixed terminal.

Herein, the third double-pole double-throw switch 12 can implement a connection between the following radio frequency circuit and the third antenna 5 or fourth antenna 6: the second signal receiving circuit 4 or the first signal transmitting circuit or the second signal transmitting circuit. Because the third double-pole double-throw switch 12 has low component loss and good isolation, not only transmission performance of the radio frequency front-end circuit can be improved, but also reception performance of the radio frequency front-end circuit can be improved.

Further, the radio frequency front-end circuit according to some embodiments of this disclosure further includes a fourth signal receiving circuit 13, which is connected to the seventh movable terminal of the third double-pole double-throw switch 12 and receives a signal through one of the third antenna 5 and the fourth antenna 6, where the third double-pole double-throw switch 12 is further configured to connect the seventh movable terminal to the seventh fixed terminal or the eighth fixed terminal.

Herein, the third double-pole double-throw switch 12 can further implement a connection between the fourth signal receiving circuit 13 and the third antenna 5 or fourth antenna 6. Because the third double-pole double-throw switch 12 has low component loss and good isolation, transmission performance of the fourth signal receiving circuit 13 can be improved.

It should be noted that the third double-pole double-throw switch 12 includes two movable terminals (namely, the sixth movable terminal and the seventh movable terminal) and two fixed terminals (namely, the seventh fixed terminal and the eighth fixed terminal). Each of the movable terminals can be connected to one of the two fixed terminals.

Herein, the fourth signal receiving circuit 13 includes a fourth low-noise amplifier and a fourth filter, where the fourth filter is connected to both an input terminal of the fourth low-noise amplifier and the seventh movable terminal of the third double-pole double-throw switch 12.

Specifically, when an eighth movable terminal of the second changeover switch 8 is connected to a ninth fixed terminal of the second changeover switch 8, the second signal receiving circuit 4 is closed.

When the eighth movable terminal is connected to a tenth fixed terminal of the second changeover switch 8, and the first movable terminal of the first double-pole double-throw switch 9 is connected to the second fixed terminal of the first double-pole double-throw switch 9, the first signal transmitting circuit is closed, and the second fixed terminal is connected to the tenth fixed terminal.

When the eighth movable terminal is connected to the tenth fixed terminal of the second changeover switch 8, and the second movable terminal of the first double-pole double-throw switch 9 is connected to the second fixed terminal of the first double-pole double-throw switch 9, the second signal transmitting circuit is closed.

Herein, optionally, the second changeover switch 8 is a single-pole double-throw switch, including a movable terminal (namely, the eighth movable terminal) and two fixed terminals (namely, the ninth fixed terminal and the tenth fixed terminal). The second changeover switch 8 implements switching between a receiving circuit and a transmitting circuit.

Based on this, in another optional embodiment, the second signal receiving circuit 4 includes a second low-noise amplifier and a second filter.

Specifically, an input terminal of the second low-noise amplifier is connected to the ninth fixed terminal of the second changeover switch 8; and the second filter is connected to both the eighth movable terminal of the second changeover switch 8 and the sixth movable terminal of the third double-pole double-throw switch 12.

Optionally, the first signal transmitting circuit includes a first power amplifier, where an output terminal of the first power amplifier is connected to the first movable terminal of the first double-pole double-throw switch 9.

Specifically, in the embodiment shown in FIG. 2, when the first movable terminal of the first double-pole double-throw switch 9 is connected to the first fixed terminal of the first double-pole double-throw switch 9, and the fifth movable terminal of the first changeover switch 7 is connected to the sixth fixed terminal of the first changeover switch 7, the first signal transmitting circuit is closed, and in this case, the first signal transmitting circuit includes the first power amplifier and the first filter.

When the first movable terminal of the first double-pole double-throw switch 9 is connected to the second fixed terminal of the first double-pole double-throw switch 9, and the eighth movable terminal of the second changeover switch 8 is connected to the tenth fixed terminal of the second changeover switch 8, the first signal transmitting circuit is closed, and in this case, the first signal transmitting circuit includes the first power amplifier and the second filter.

Optionally, the second signal transmitting circuit includes a second power amplifier, where an output terminal of the second power amplifier is connected to the second movable terminal of the first double-pole double-throw switch 9.

Specifically, in the embodiment shown in FIG. 2, when the second movable terminal of the first double-pole double-throw switch 9 is connected to the first fixed terminal of the first double-pole double-throw switch 9, and the fifth movable terminal of the first changeover switch 7 is connected to the sixth fixed terminal of the first changeover switch 7, the second signal transmitting circuit is closed, and in this case, the second signal transmitting circuit includes the second power amplifier and the first filter.

When the second movable terminal of the first double-pole double-throw switch 9 is connected to the second fixed terminal of the first double-pole double-throw switch 9, and the eighth movable terminal of the second changeover switch 8 is connected to the tenth fixed terminal of the second changeover switch 8, the second signal transmitting circuit is closed, and in this case, the second signal transmitting circuit includes the second power amplifier and the second filter.

Further, the radio frequency front-end circuit according to some embodiments of this disclosure further includes a radio frequency transceiver (not shown in the figure). The radio frequency transceiver is connected to all of the first signal receiving circuit 1, the second signal receiving circuit 4, the first signal transmitting circuit, and the second signal transmitting circuit.

In addition, the radio frequency transceiver is further connected to both the third signal receiving circuit 11 and the fourth signal receiving circuit 13.

Specifically, the radio frequency transceiver may include: a first signal receiving port, a second signal receiving port, a third signal receiving port, a fourth signal receiving port, a first signal transmitting port, and a second signal transmitting port.

The first signal receiving port is connected to an output terminal of the first low-noise amplifier of the first signal receiving circuit 1. The second signal receiving port is connected to an output terminal of the second low-noise amplifier of the second signal receiving circuit 4. The third signal receiving port is connected to an output terminal of the third low-noise amplifier of the third signal receiving circuit 11. The fourth signal receiving port is connected to an output terminal of the fourth low-noise amplifier of the fourth signal receiving circuit 13.

The first signal transmitting port is connected to the first power amplifier of the first signal transmitting circuit. The second signal transmitting port is connected to the second power amplifier in the second signal transmitting circuit.

The radio frequency front-end circuit in FIG. 2 can implement a 1T4R/2T4R function of a 5G NR system, to ensure the function of 1 transmit and 4 receive, or 2 transmit and 4 receive.

The following briefly describes a signal transmission process of the radio frequency front-end circuit of this disclosure.

For a Transmission Path:

1. After a first to-be-transmitted signal is transmitted by the radio frequency transceiver and amplified by the first power amplifier, and then reaches the first double-pole double-throw switch 9,
    (1) the signal may be transmitted to the first changeover switch 7 and filtered by the first filter, and then reaches the second double-pole double-throw switch 10 to be transmitted from the first antenna 2 or second antenna 3; or
    (2) the signal may be transmitted to the second changeover switch 8 and filtered by the second filter, and then reaches the third double-pole double-throw switch 12 to be transmitted from the third antenna 5 or fourth antenna 6.

2. After a second to-be-transmitted signal is transmitted by the radio frequency transceiver and amplified by the second power amplifier, and then reaches the first double-pole double-throw switch 9,
    (1) the signal may be transmitted to the first changeover switch 7 and filtered by the first filter, and then reaches the second double-pole double-throw switch 10 to be transmitted from the first antenna 2 or second antenna 3; or
    (2) the signal may be transmitted to the second changeover switch 8 and filtered by the second filter, and then reaches the third double-pole double-throw switch 12 to be transmitted from the third antenna 5 or fourth antenna 6.

For a reception path:

because the 5G NR system needs to support 4 simultaneous receptions, a first to-be-received signal may be received through the first antenna 2, then reaches the second double-pole double-throw switch 10, and then is filtered by the first filter, transferred through the first changeover switch 7 to the first low-noise amplifier for amplification, and transmitted to the radio frequency transceiver for subsequent processing.

Similarly, a third to-be-received signal may be received through the third antenna 5, then reaches the third double-pole double-throw switch 12, and then is filtered by the second filter, transferred through the second changeover switch 8 to the second low-noise amplifier for amplification, and transmitted to the radio frequency transceiver for subsequent processing.

A second to-be-received signal may be received through the second antenna 3, then transferred through the second double-pole double-throw switch 10 to the third filter for filtering, and then is amplified by the third low-noise amplifier and transmitted to the radio frequency transceiver for subsequent processing.

Similarly, a fourth to-be-received signal may be received through the fourth antenna 6, then transferred through the third double-pole double-throw switch 12 to the fourth filter for filtering, and then is amplified by the fourth low-noise amplifier and transmitted to the radio frequency transceiver for subsequent processing.

In the radio frequency front-end circuit according to some embodiments of this disclosure, the four receiving circuits: the first signal receiving circuit, the second signal receiving circuit, the third signal receiving circuit, and the fourth signal receiving circuit, can receive a signal at the same time; and the first signal transmitting circuit and/or the second signal transmitting circuit can be flexibly closed through the first double-pole double-throw switch and the first changeover switch or through the first double-pole double-throw switch and the second changeover switch. This circuit design is simple, and can shorten layout routing for radio frequency while implementing signal transmission and/or reception, thereby reducing path loss.

In addition, it should be noted that to shorten circuit design time of manufacturers and reduce costs, the radio frequency front-end circuit of this disclosure may further be integrated into an integrated circuit chip.

Some embodiments of this disclosure further provide a mobile terminal, including: a controller; and the radio frequency front-end circuit according to the foregoing embodiments. The controller is configured to control opening and closing of a first double-pole double-throw switch, opening and closing of a first changeover switch, and/or opening and closing of a second changeover switch.

In addition, the controller is further configured to control opening and closing of the second double-pole double-throw switch and/or opening and closing of the third double-pole double-throw switch.

The foregoing describes the embodiments of this disclosure with reference to the accompanying drawings. However, this disclosure is not limited to the foregoing specific embodiments. The foregoing specific embodiments are merely illustrative rather than restrictive. Inspired by this disclosure, persons of ordinary skill in the art may develop many other forms without departing from the principle of this disclosure and the protection scope of the claims, and all such forms fall within the protection scope of this disclosure.

What is claimed is:

1. A radio frequency front-end circuit, comprising:
    a first signal receiving circuit that receives a signal through one antenna, among a first antenna and a second antenna, connected to the first signal receiving circuit;
    a second signal receiving circuit that receives a signal through one antenna, among a third antenna and a fourth antenna, connected to the second signal receiving circuit;
    a first signal transmitting circuit and a second signal transmitting circuit, wherein the first signal transmitting circuit comprises a first power amplifier, the second signal transmitting circuit comprises a second power amplifier;
    a first changeover switch and a second changeover switch; and
    a first double-pole double-throw switch which comprises a first fixed terminal connected to the first changeover switch, a second fixed terminal connected to the second changeover switch, a first movable terminal connected to an output terminal of the first power amplifier but not to an input terminal of the first power amplifier, and a second movable terminal connected to an output terminal of the second power amplifier but not to an input terminal of the second power amplifier, wherein the first double-pole double-throw switch is configured to connect the first fixed terminal to the first movable terminal or the second movable terminal, and further configured to connect the second fixed terminal to the first movable terminal or the second movable terminal, wherein the first signal transmitting circuit is closed through the first double-pole double-throw switch and the first changeover switch, and transmits a signal through the first antenna or the second antenna; or the first signal transmitting circuit is closed through the first double-pole double-throw switch and the second changeover switch, and transmits a signal through the third antenna or the fourth antenna; and the second signal transmitting circuit is closed through the first double-pole double-throw switch and the first changeover switch, and transmits a signal through the first antenna or the second antenna; or the second signal transmitting circuit is closed through the first double-pole double-throw switch and the second changeover switch, and transmits a signal through the third antenna or the fourth antenna.

2. The radio frequency front-end circuit according to claim 1, further comprising:

a second double-pole double-throw switch connected to the first signal receiving circuit or the first signal transmitting circuit or the second signal transmitting circuit, wherein the second double-pole double-throw switch comprises a third movable terminal, a third fixed terminal connected to the first antenna, and a fourth fixed terminal connected to the second antenna, wherein the second double-pole double-throw switch is configured to connect the first movable terminal to the third fixed terminal or the fourth fixed terminal.

3. The radio frequency front-end circuit according to claim 2, further comprising a third signal receiving circuit, which is connected to a fourth movable terminal of the second double-pole double-throw switch and receives a signal through one of the first antenna and the second antenna, wherein the second double-pole double-throw switch is further configured to connect the fourth movable terminal to the third fixed terminal or the fourth fixed terminal.

4. The radio frequency front-end circuit according to claim 3, wherein the third signal receiving circuit comprises a third low-noise amplifier and a third filter, wherein the third filter is connected to both an input terminal of the third low-noise amplifier and the fourth movable terminal.

5. The radio frequency front-end circuit according to claim 2, wherein when a fifth movable terminal of the first changeover switch is connected to a fifth fixed terminal of the first changeover switch, the first signal receiving circuit is closed;

when the fifth movable terminal is connected to a sixth fixed terminal of the first changeover switch, and the first movable terminal is connected to the first fixed terminal, the first signal transmitting circuit is closed, and the first fixed terminal is connected to the sixth fixed terminal; and when the fifth movable terminal is connected to the sixth fixed terminal of the first changeover switch, and the second movable terminal is connected to the first fixed terminal, the second signal transmitting circuit is closed.

6. The radio frequency front-end circuit according to claim 5, wherein the first signal receiving circuit comprises a first low-noise amplifier and a first filter, wherein an input terminal of the first low-noise amplifier is connected to the fifth fixed terminal; and the first filter is connected to both the fifth movable terminal and the third movable terminal.

7. The radio frequency front-end circuit according to claim 1, further comprising:

a third double-pole double-throw switch connected to the second signal receiving circuit or the first signal transmitting circuit or the second signal transmitting circuit, comprising: a sixth movable terminal, a seventh fixed terminal connected to the third antenna, and an eighth fixed terminal connected to the fourth antenna, wherein the third double-pole double-throw switch is configured to connect the sixth movable terminal to the seventh fixed terminal or the eighth fixed terminal.

8. The radio frequency front-end circuit according to claim 7, further comprising a fourth signal receiving circuit, connected to the seventh movable terminal of the third double-pole double-throw switch, receiving a signal through one of the third antenna and the fourth antenna, wherein the third double-pole double-throw switch is further configured to connect the seventh movable terminal to the seventh fixed terminal or the eighth fixed terminal.

9. The radio frequency front-end circuit according to claim 8, wherein the fourth signal receiving circuit comprises a fourth low-noise amplifier and a fourth filter, wherein the fourth filter is connected to both an input terminal of the fourth low-noise amplifier and the seventh movable terminal.

10. The radio frequency front-end circuit according to claim 7, wherein when an eighth movable terminal of the second changeover switch is connected to a ninth fixed terminal of the second changeover switch, the second signal receiving circuit is closed;

when the eighth movable terminal is connected to a tenth fixed terminal of the second changeover switch, and the first movable terminal is connected to the second fixed terminal, the first signal transmitting circuit is closed, and the second fixed terminal is connected to the tenth fixed terminal; and when the eighth movable terminal is connected to the tenth fixed terminal of the second changeover switch, and the second movable terminal is connected to the second fixed terminal, the second signal transmitting circuit is closed.

11. The radio frequency front-end circuit according to claim 10, wherein the second signal receiving circuit comprises a second low-noise amplifier and a second filter, wherein an input terminal of the second low-noise amplifier is connected to the ninth fixed terminal; and the second filter is connected to both the eighth movable terminal and the sixth movable terminal.

12. The radio frequency front-end circuit according to claim 1, further comprising:

a radio frequency transceiver, wherein the radio frequency transceiver is connected to all of the first signal receiving circuit, the second signal receiving circuit, the first signal transmitting circuit, and the second signal transmitting circuit.

13. A mobile terminal, comprising:

a controller; and a radio frequency front-end circuit, wherein the radio frequency front-end circuit comprises:

a first signal receiving circuit that receives a signal through one antenna, among a first antenna and a second antenna, connected to the first signal receiving circuit;

a second signal receiving circuit that receives a signal through one antenna, among a third antenna and a fourth antenna, connected to the second signal receiving circuit;

a first signal transmitting circuit and a second signal transmitting circuit, wherein the first signal transmitting circuit comprises a first power amplifier, the second signal transmitting circuit comprises a second power amplifier;

a first changeover switch and a second changeover switch; and a first double-pole double-throw switch which comprises a first fixed terminal connected to the first changeover switch, a second fixed terminal connected to the second changeover switch, a first movable terminal connected to an output terminal of the first power amplifier but not to an input terminal of the first power amplifier, and a second movable terminal connected to an output terminal of the second power amplifier but not to an input terminal of the second power amplifier, wherein the first double-pole double-throw switch is configured to connect the first fixed terminal to the first movable terminal or the second movable terminal, and further configured to connect the second fixed terminal to the first movable terminal or the second movable terminal, wherein the first signal transmitting circuit is closed through the first double-pole double-throw switch and the first changeover switch, and transmits a signal through the first antenna or the second antenna; or the first signal transmitting circuit is closed through the first double-pole double-throw switch and the second changeover switch, and transmits a signal through the third antenna or the fourth antenna; and the second signal transmitting circuit is closed through the first double-pole double-throw switch and the first changeover switch, and transmits a signal through the first antenna or the second antenna; or the second signal transmitting circuit is closed through the first double-pole double-throw switch and the second changeover switch, and transmits a signal through the third antenna or the fourth antenna;

the controller is configured to control opening and closing of a first double-pole double-throw switch, opening and closing of a first changeover switch, and/or opening and closing of a second changeover switch.

14. The mobile terminal according to claim 13, wherein the radio frequency front-end circuit further comprises:
a second double-pole double-throw switch connected to the first signal receiving circuit or the first signal transmitting circuit or the second signal transmitting circuit, wherein the second double-pole double-throw switch comprises a third movable terminal, a third fixed terminal connected to the first antenna, and a fourth fixed terminal connected to the second antenna, wherein the second double-pole double-throw switch is configured to connect the first movable terminal to the third fixed terminal or the fourth fixed terminal.

15. The mobile terminal according to claim 14, wherein the radio frequency front-end circuit further comprises: a third signal receiving circuit, which is connected to a fourth movable terminal of the second double-pole double-throw switch and receives a signal through one of the first antenna and the second antenna, wherein the second double-pole double-throw switch is further configured to connect the fourth movable terminal to the third fixed terminal or the fourth fixed terminal.

16. The mobile terminal according to claim 14, wherein when a fifth movable terminal of the first changeover switch is connected to a fifth fixed terminal of the first changeover switch, the first signal receiving circuit is closed;
when the fifth movable terminal is connected to a sixth fixed terminal of the first changeover switch, and the first movable terminal is connected to the first fixed terminal, the first signal transmitting circuit is closed, and the first fixed terminal is connected to the sixth fixed terminal; and
when the fifth movable terminal is connected to the sixth fixed terminal of the first changeover switch, and the second movable terminal is connected to the first fixed terminal, the second signal transmitting circuit is closed.

17. The mobile terminal according to claim 13, wherein the radio frequency front-end circuit further comprises: a third double-pole double-throw switch connected to the second signal receiving circuit or the first signal transmitting circuit or the second signal transmitting circuit, comprising: a sixth movable terminal, a seventh fixed terminal connected to the third antenna, and an eighth fixed terminal connected to the fourth antenna, wherein the third double-pole double-throw switch is configured to connect the sixth movable terminal to the seventh fixed terminal or the eighth fixed terminal.

* * * * *